(12) United States Patent
Pashkovsky

(10) Patent No.: US 12,092,951 B2
(45) Date of Patent: Sep. 17, 2024

(54) DEVICE FOR CAPTURING A LONG EXPOSURE IMAGE

(71) Applicant: Vladimir Eliich Pashkovsky, St. Petersburg (RU)

(72) Inventor: Vladimir Eliich Pashkovsky, St. Petersburg (RU)

(*) Notice: Subject to any disclaimer, the term of this patent is extended or adjusted under 35 U.S.C. 154(b) by 115 days.

(21) Appl. No.: 17/638,149

(22) PCT Filed: Aug. 15, 2020

(86) PCT No.: PCT/RU2020/050190
§ 371 (c)(1),
(2) Date: Feb. 24, 2022

(87) PCT Pub. No.: WO2021/045652
PCT Pub. Date: Mar. 11, 2021

(65) Prior Publication Data
US 2022/0299841 A1    Sep. 22, 2022

(30) Foreign Application Priority Data

Sep. 3, 2019   (RU) ............................ RU2019127675

(51) Int. Cl.
*G03B 7/00*        (2021.01)
*H04N 23/55*    (2023.01)
*H04N 23/73*    (2023.01)

(52) U.S. Cl.
CPC ............... *G03B 7/00* (2013.01); *H04N 23/55* (2023.01); *H04N 23/73* (2023.01)

(58) Field of Classification Search
CPC . G03B 7/00; G03B 41/00; G03B 9/08; G03B 7/08; H04N 23/55; H04N 23/73; H04N 23/6812; H04N 23/75; H04N 23/681; G02B 23/00; G02B 23/12; G01S 19/26; G06T 7/60
See application file for complete search history.

(56) References Cited

U.S. PATENT DOCUMENTS

| | | | |
|---|---|---|---|
| 3,864,035 A | 2/1975 | Kuehnle | |
| 8,866,922 B2 * | 10/2014 | Tsubaki | ............... H04N 25/587 348/222.1 |
| 11,353,564 B2 * | 6/2022 | Yamane | ................ G01S 7/4876 |
| 2004/0160525 A1 * | 8/2004 | Kingetsu | ............ H04N 23/6812 348/E5.046 |
| 2006/0115254 A1 | 6/2006 | Nomura | |
| 2008/0044170 A1 * | 2/2008 | Yap | ........................ G03B 7/093 396/246 |

FOREIGN PATENT DOCUMENTS

| | | |
|---|---|---|
| RU | 93005699 A | 1/1995 |
| RU | 2306584 C1 | 9/2007 |

OTHER PUBLICATIONS

Search Report in PCT/RU2020/050190, dated Feb. 18, 2021.

\* cited by examiner

*Primary Examiner* — Ahmed A Berhan
(74) *Attorney, Agent, or Firm* — Bardmesser Law Group

(57) ABSTRACT

The invention relates to a field of capturing images requiring a long exposure, e.g., when photographing faint objects. The device comprises an image formation unit, an image capture unit, a primary shutter and a secondary shutter connected to at least one disturbance detector via a control unit.

18 Claims, 3 Drawing Sheets

DEVICE FOR CAPTURING A LONG EXPOSURE IMAGE

CROSS REFERENCE TO RELATED APPLICATIONS

This application is a US National Phase of PCT/RU2020/050190, filed on Aug. 15, 2020, which claims priority to Russian Patent Application No. 2019127675, filed on Sep. 3, 2019, incorporated herein by reference.

FIELD OF THE INVENTION

The invention relates to a field of capturing images requiring a long exposure, e.g., when photographing faint objects.

CONVENTIONAL ART

There are some fields where capturing an image requires a long exposure. For example, acquiring images in astronomy may require hundreds seconds of exposure. A long exposure is also needed in microscopy. In particular, when shooting faintly fluorescent objects in fluorescence microscopy, tens of seconds of exposure may need to be used.

Currently, capturing images of faint objects is performed using photosensitive arrays, in particular, those based on CCD (charge-coupled device) technology. A photosensitive array is an electronic device that integrates charge during exposure. When integration process is over, the accumulated charge is dropped. Next exposure even after a short time means starting charge integration process from the initial level, therefore, operation of the photosensitive array must not be interrupted during the entire exposure time.

A risk of impact of disturbances on the acquired image rises during a long exposure. The disturbances may be of different nature. They may relate to shock or vibration of an image capturing device or optical device due to earth tremor, e.g., while earthquake ground shaking. They may relate to light pollution, e.g., due to pulsed illumination devices or due to satellites being bright objects travelling in the telescope field of view. Starlink, for example, contemplates thousands of satellites, each of which can travel rapidly across the telescope's field of view, leaving a track on the CCD that is fairly bright and cannot be easily dealt with using conventional means due to saturation of the pixels.

A primary shutter of such optical devices does not facilitate eliminating the disturbances. Usually, it is not a fast shutter, but rather intended for opening and closing an image capture unit in the beginning and in the end of the capturing process, correspondingly. This typically takes 0.5 to 1.0 seconds. As mentioned above, it is not expedient to interrupt operation of the photosensitive array for elimination of the disturbances, since the integrated charge would be lost.

The applicant's research did not reveal any sources containing a solution for this problem. However, the following approaches are known in the art.

Patent RU 2662907, published on Jul. 31, 2018, IPC G02B 23/00, discloses a method of reducing light pollution of astronomy devices by light of outdoor illumination devices. The method includes time separation of operation periods of the astronomy devices and the illumination devices. A pulsed light flux is formed with a frequency of 300 to 1000 Hz and a duty ratio of 2 to 10, wherein interrupting a light flux to the photosensitive array of an astronomy device is performed in pulsed mode aligned by frequency and in counter-phase with the formed light flux.

Patent application RU 93005699, published on Jan. 27, 1995, IPC G01J 1/44, discloses a "Device for protection of photo-receiver against light interferences" comprising a lens and a beam splitter installed behind the lens. The beam splitter assures operations of two optical channels each comprising a photo-receiver. The device is characterized by an optical component that is installed in one of the channels between the beam splitter and the photo-receiver. The optical component has a variable attenuation ratio and comprises a grid mesh made of control electrodes. The other channel comprises a neutral optical light filter between the beam splitter and the photo-receiver. The photo-receiver is connected to a processor via an adapter device. A control unit may be connected to the same processor. The control unit is coupled with the optical component having variable attenuation ratio. The device may be used in different areas of science and technology, such as aviation, astronomy, geodesy, navigation, etc.

Russian utility model UA68352U, published on Mar. 26, 2012, IPC G02B 023/00, discloses a portable laser telescope of a receiver channel for determination of artificial satellite location. The telescope contains a collimator, a first convergence lens, a disturbance filter, a second convergence lens, a propeller shutter and a photomultiplier device, all optically connected. A disk having four neutral filters is located between the disturbance filter and the second convergence lens. The disk is connected to a disk rotation mechanism and a position sensor. The neutral filters have a transmission ratio selected from among 25%, 50%, 75% and 100%.

Patent RU2042155, published on Aug. 8, 1995, IPC G01S 17/00, discloses a "Device for discovering object with stellar background" that provides discovering, e.g., artificial geosynchronous satellites. The device includes a receiving telescope, a spatial light modulator equipped with a control unit, a coherent light source, a polarization beam splitter, a lens and a transmitting television camera, where the splitter, the lens and the camera are optically connected; a comparator device, a threshold device and a video monitoring device, where the comparator, the threshold device and the monitor are sequentially connected; and a control and calculation unit. The device additionally comprises an electrooptical shutter equipped with a control unit and located between the coherent light source and the polarization beam splitter. The spatial light modulator is an electrooptical convertor having a first transparent electrode, a dielectric mirror, a photorefractive crystal and a second transparent electrode applied sequentially.

The above-mentioned solutions fail to solve a problem of assuring operation of a device for capturing long-exposure images in presence of disturbances with no interruption of image capturing process.

A technical result of the invention is therefore providing for operation of the device for capturing long-exposure images in the presence of different disturbances with no interruption of image integration process.

SUMMARY OF THE INVENTION

In one aspect, a device for capturing long-exposure images includes an image formation unit, an image capture unit, a primary shutter and a secondary shutter connected to at least one disturbance detector via a control unit. The secondary shutter may be installed between the image formation unit and the image capture unit. Moreover, the secondary shutter may be installed inside or integrated with the image formation unit.

The secondary shutter may also be installed in front of the image formation unit. The secondary shutter may be provided in form of a high-speed shutter. The disturbance detector may be provided in form of a vibration detector. The disturbance detector may be provided in form of a detector for monitoring objects that are able to distort the image.

The disturbance detector may also be provided in form of a device for monitoring satellite orbits.

In addition, the disturbance detector may be provided in form of a detector that provides synchronization with pulsed light sources. The control unit may be configured to control the secondary shutter. The control unit may be configured to control both the primary shutter and the secondary shutter. The mentioned detector examples do not limit embodiments of this device. There may be other disturbances, whose occurrence requires closing the secondary shutter.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
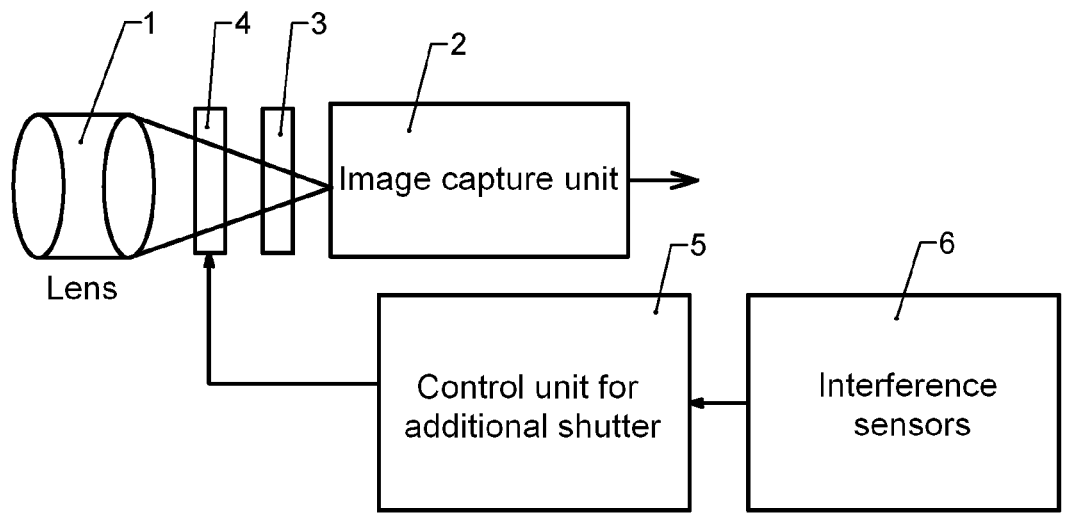
FIG. 1 represents a schematic diagram of a device for capturing long-exposure images having a secondary shutter.

Reference will now be made in detail to the preferred embodiments of the present invention, examples of which are illustrated in the accompanying drawings.

A device for capturing long-exposure images (FIG. 1) includes an image formation unit (1), e.g., a lens; an image capture unit (2), e.g., a detector; and a shutter (3) such as a primary shutter providing start and end of integration mode in the image capture unit (2). The image capture unit (2) may be implemented, based on photosensitive arrays, in particular, based on CCD matrix technology.

Usually, devices for capturing long-exposure images use primary shutters (3) implemented as electronic, mechanical, electromechanical or electronic-optical shutters, which are typically low-speed shutters (e.g., curtain shutters) able to exclude impact of vibrations, electromagnetic radiation, heat and other negative factors related to high-speed devices on operation of the image capture unit. Alternatively, they may be electronic shutters embedded into the device for capturing long-exposure images, where a transition to closed state means not only an interruption of input flow of electromagnetic energy that a photosensitive array is exposed to, but also cancelling integration of that energy and further losing the integrated energy.

The device for capturing long-exposure images according to the invention also comprises a secondary shutter (4) that is connected to disturbance detectors (6) via a control unit (5). The secondary shutter (4) may be located anywhere upstream of the image capture unit (2). For example, it may be located in front of the image formation unit (1) (i.e., the lens) or embedded into the image formation unit (1) or located behind the image formation unit (1). In particular, it can be located at a distance from the image capture unit (2) so as mechanical oscillations of the secondary shutter (4), as well as thermal and electromagnetic energy radiated by it would not cause any substantial negative effect on the image capture unit (2).

Devices for capturing long-exposure images are mainly used in fields, where electromagnetic radiation has to be captured, in particular, in the range of light radiation of faint objects. These fields relate to astronomy and to microscopic photography (microscopy), in particular, to fluorescence microscopy.

Figure 2:
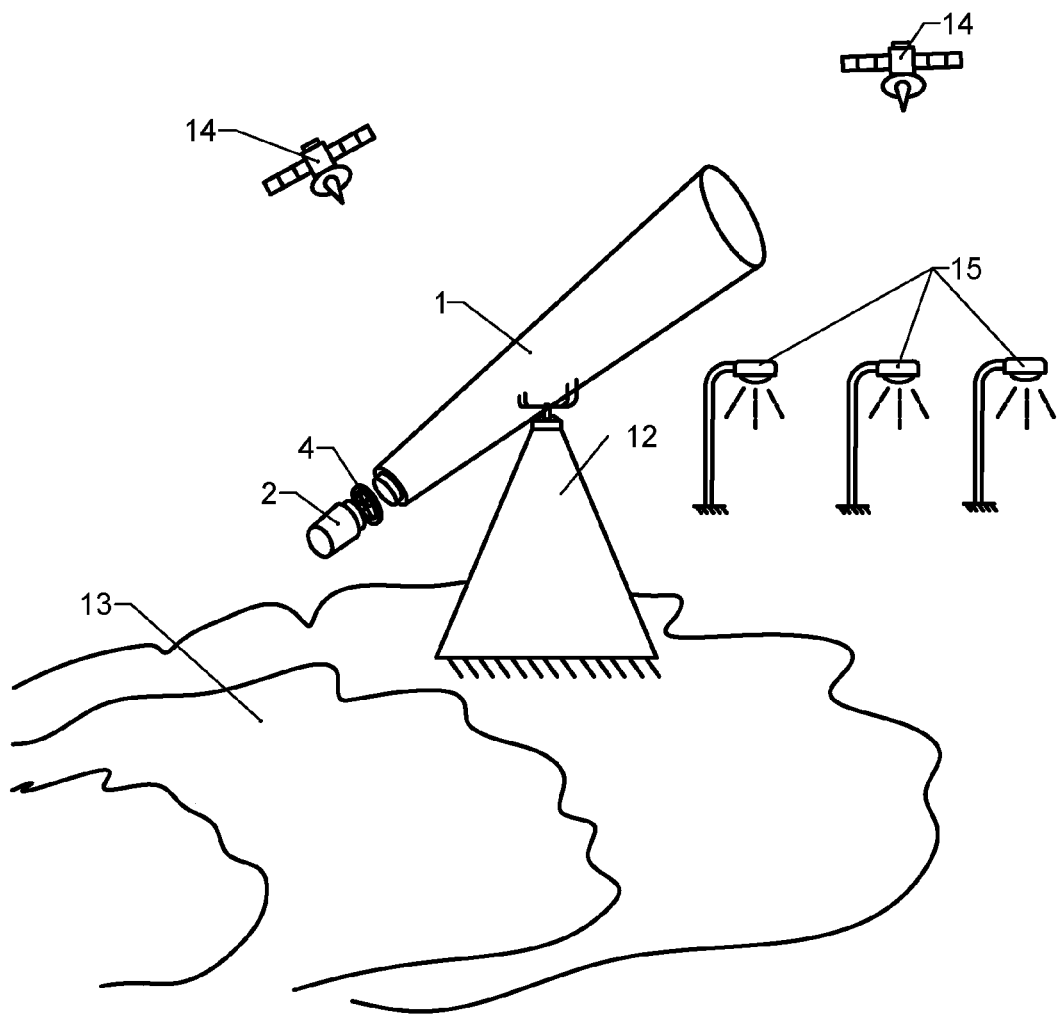
FIG. 2 represents a drawing illustrating operation of a secondary shutter mounted on a telescope.
Figure 3:
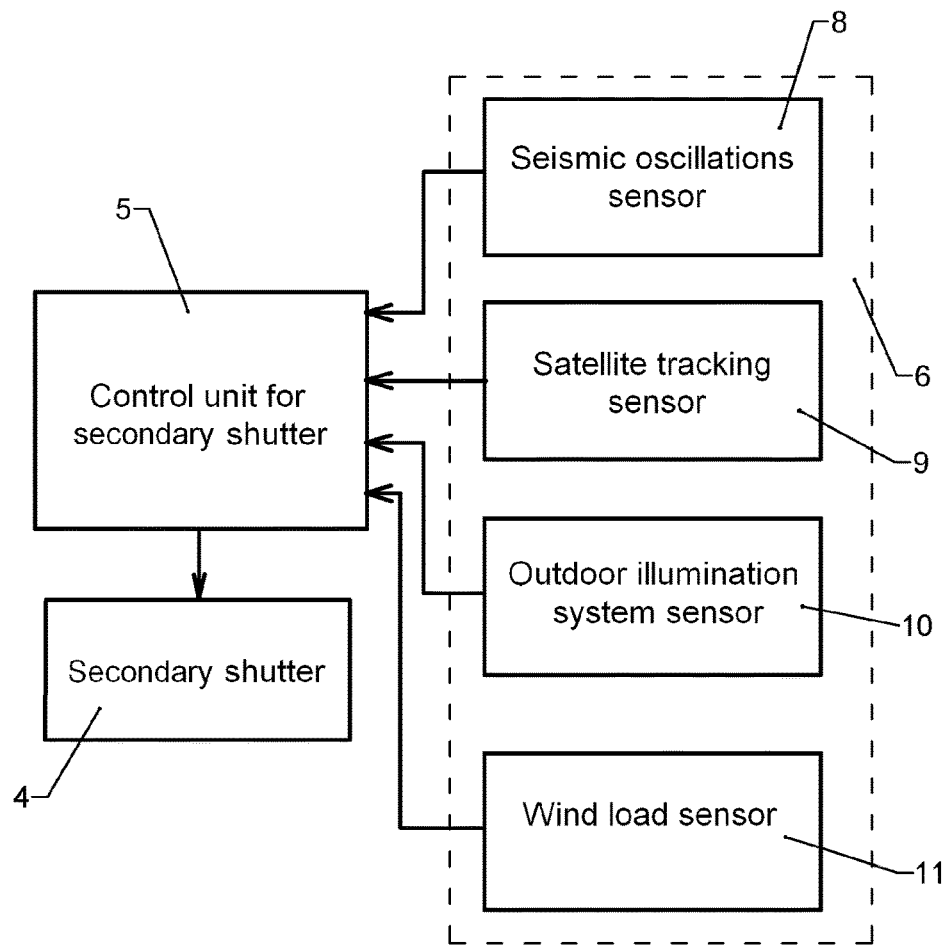
FIG. 3 represents a schematic diagram of controlling a secondary shutter using disturbance detectors, illustrated in example of a telescope.

FIG. 3 shows an example of the control unit (5) having the secondary shutter (4) and the disturbance detectors (6) for a telescope (12). A drawing illustrating this implementation example is provided in FIG. 2. Sometimes it happens that disturbance for capturing an image by a camera mounted in the telescope (12) is caused by artificial earth satellites (14) caught in the frame or by light pulses of outdoor pulse illumination systems (15), e.g., such as a system mentioned in RU patent 2662907, or when a seismic wave (13) generated by earthquake disturbs the telescope (12) and the image capture unit (2) (the detector) and thus causes shift of projected image of space objects in the image capture unit of the telescope.

The secondary shutter (4) is preferably a high-speed shutter (operating time 50 ms or less, preferably less than 30 ms) in order to reduce loss in exposure during switching and should provide a fast response to emerging sudden and short disturbances, i.e., it shall be able to repeatedly switch between open and closed states in a few milliseconds or faster (typically about 50 ms operation time, generally in the 30-100 ms range, but as a rule, the shorter the better). It may be provided as a mechanical or electromechanical device (like a curtain shutter, a lamellar shutter, a rotary shutter, etc.) or as an electronic-optical device (like a liquid crystal-based optical screen, etc.) or as another suitable device.

A disturbance detector (8) for seismic oscillations as well as for other oscillations of a base of any device, e.g., a microscope, may be provided as a vibration detector. A wind load detector (11) may also be provided as a vibration detector.

A disturbance detector (9) for glow of moving satellites may be provided as an object tracking detector. For instance, it may be provided as a device for surveying satellite orbits. Also, satellite orbits are known and available from public databases, e.g., from NORAD, and, thus, the timing of the satellite being in the field of view can be predicted accurately, for purposes of control unit (7) operation.

A disturbance detector (10) for light pollution by pulsed light sources may be provided as a detector for synchronizing with the pulsed light sources.

A control unit (7), i.e., a unit for control of the shutters and the image capture units (FIG. 4) may be configured to control the primary shutter, the secondary shutter and the detector of the image capture unit. In this case, it controls every switching the image capture unit (2) on and off.

The primary shutter (3) may also be an electronic switch embedded into the photosensitive array, so switching the array on and off means simultaneously switching the primary shutter on and off.

The device for capturing long-exposure images according to the diagram represented in FIG. 1 operates as follows.

Initially, the secondary shutter (4) is in an open state. It remains so until an instruction comes from any of the disturbance detectors (8, 9, 10, 11).

Figure 4:
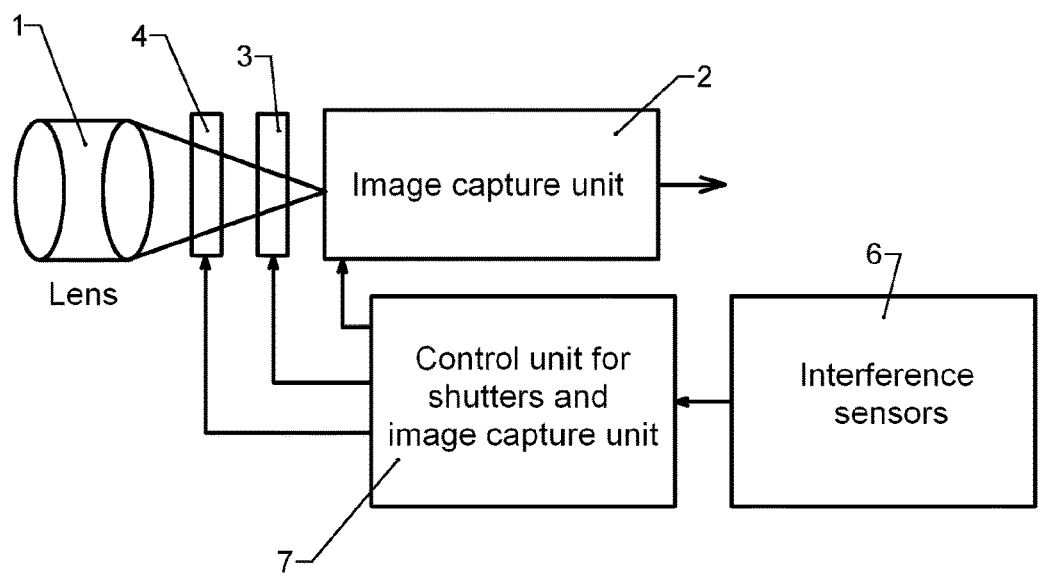
FIG. 4 represents a schematic diagram of a device for capturing long-exposure images, wherein a control unit controls a primary shutter, a secondary shutter and an image capture unit.
Figure 5:
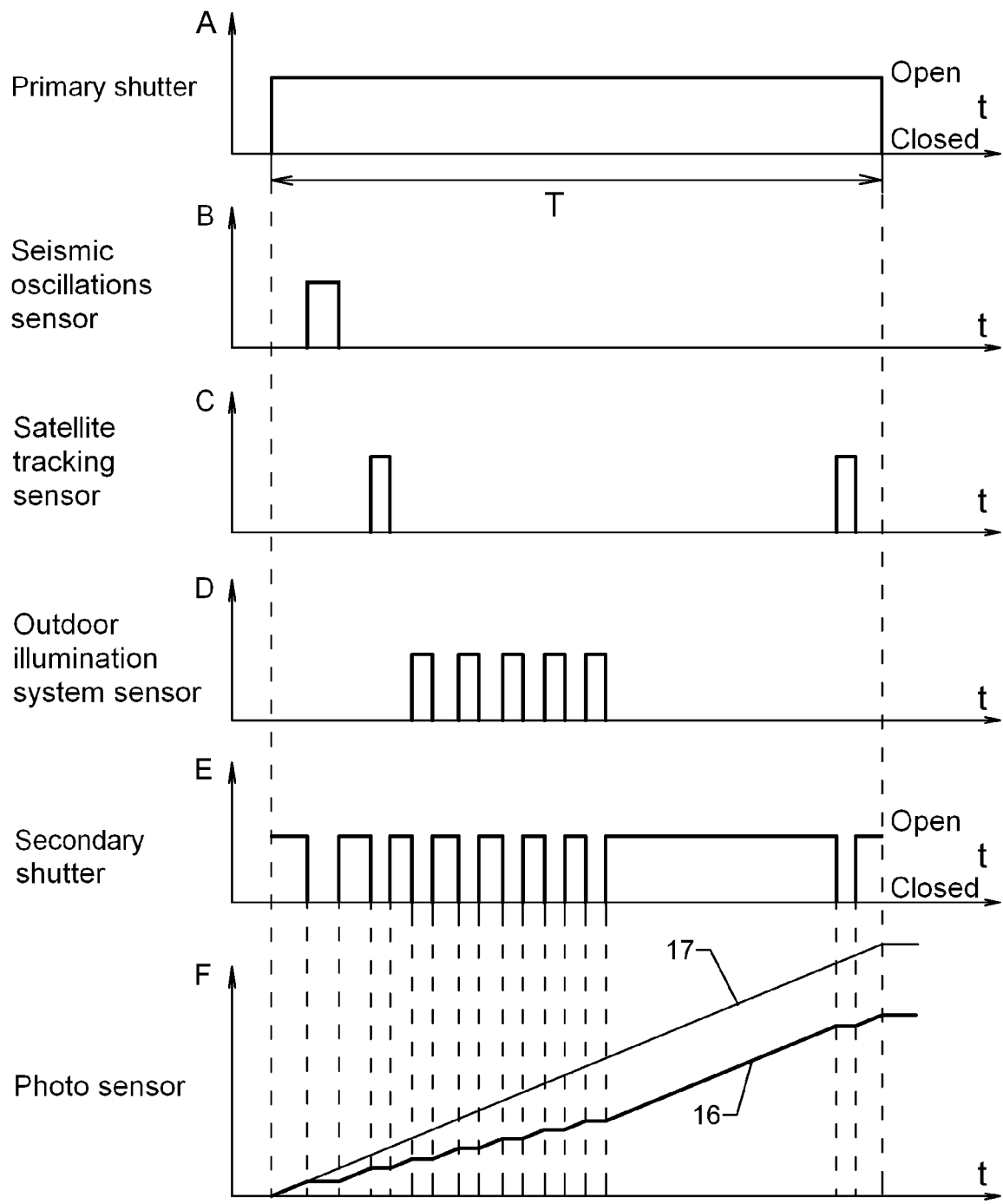
FIG. 5 represents an operation time diagram for the device with a secondary shutter.

Further, the photosensitive array of the image capture unit (2) is activated (FIG. 2, FIG. 4, FIG. 5). The photosensitive array remains active while the image capturing device operates, even when the device is exposed to external disturbances. As it was mentioned, deactivation of the array causes loss of the integrated light energy and the process shall be started from the very beginning. Thus, the process of capturing image begins by opening the primary shutter (3) for time T (FIG. 5 (A)). Usually, the primary shutter (3) is not a fast shutter in such devices. If a disturbance occurs, a corresponding detector triggers. For example, it may be the seismic oscillations detector (8) (FIG. 5 (B)), the satellite tracking detector (9) (FIG. 5 (C)) or the outdoor illumination system detector (10) (FIG. 5 (D)). Triggering any of these detectors causes a closing of the secondary shutter (4) (FIG. 5 (E)), so integration of a polluted or shifted image is blocked. The photosensitive array of the image capture unit (2) remains active. The primary shutter (3) remains open. Further, when the disturbance is over, the corresponding disturbance detector (unit 8, 9 or 10) sends a signal to the control unit (5) that generates an instruction to open the secondary shutter (4). The secondary shutter (4) opens and exposure resumes until a next disturbance occurs, i.e., until a next closing instruction comes from the control unit (5). The primary shutter (3) remains open until the end of exposure, independently on occurrence of the disturbances.

FIG. 5 (F) shows a long process of integration of charge by the photosensitive array in the image capture unit (2) for a faint object. Curve (16) indicates a process of integration of charge by the photosensitive array, when glow of the object to be photographed is constant and when occurred disturbances are suppressed. Curve (17) indicates a case of absence of disturbances, so integration is not interrupted. Comparison of curves (16) and (17) shows that upon occurrence of disturbances, the process of integration of charge by the photosensitive array for a constant glow of the object to be photographed requires more time.

Implementation of the device according to the diagram in FIG. 4 provides possibility of compensation a time lost for switching off the secondary shutter (4) upon occurrence of any disturbances to assure a required exposure and to obtain an image of desired quality. In this case, the disturbance detector unit (6) is connected to the control unit (7) of the image capture unit (2), which is also a shutter control unit. The disturbance detector unit (6) sends a signal comprising interruption time of the secondary shutter (4) to the control unit (7). Thus, the control unit (7) allows increasing exposure time of the image capture unit (2) and compensating the time lost while the secondary shutter (4) is closed.

In order to prevent decreasing quality of capturing a certain frame, exposure time shall be extended by $T_{comp} = (T1+T2+T3+ \ldots )$, where T1, T2 and T3 are time periods when the secondary shutter (4) is closed upon occurrence of disturbances.

The control unit (7) according to the diagram represented in FIG. 4 extends time T (open time of the primary shutter (3)) by length of $T_{comp}$. When implemented in such a way, the control unit (7) is able to control the image capture unit (2).

Additionally to the vibration disturbance detector of the device, a disturbance detector for inadvertently switched illumination may be used, which is per se an illumination synchronization detector.

INDUSTRIAL APPLICABILITY

The invention may be implemented in various commercially applicable devices, as well in newly developed devices.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

What is claimed is:

1. A device for capturing long-exposure images comprising:
   an image capture unit;
   an image formation unit in front of the image capture unit;
   a primary shutter in front of the image capture unit or embedded into the image capture unit;
   a secondary shutter in front of the image capture unit;
   a control unit connected to the secondary shutter and configured to close and open the secondary shutter depending on a signal received from a disturbance detector,
   wherein the primary shutter is configured to be open for at least 20 seconds during exposure, and
   wherein the secondary shutter goes from open state to closed state in less than 100 ms.

2. The device of claim 1, wherein the secondary shutter is in front of the image formation unit.

3. The device of claim 1, wherein the secondary shutter is between the image formation unit and the image capture unit.

4. The device of claim 1, wherein the secondary shutter is integrated with the image formation unit.

5. The device of claim 1, wherein the secondary shutter is faster than the primary shutter.

6. The device of claim 1, wherein the disturbance detector is a part of the device.

7. The device of claim 1, wherein the disturbance detector detects vibration.

8. The device of claim 1, wherein the control unit is further connected to the primary shutter and configured to control both the primary shutter and the secondary shutter.

9. The device of claim 1, wherein the disturbance detector is physically separate from the image capture unit, the image formation unit, the primary shutter, the secondary shutter and the control unit.

10. A device for capturing long-exposure images comprising:
    an image capture unit;

an image formation unit in front of the image capture unit;
a primary shutter in front of the image capture unit or embedded into the image capture unit;
a secondary shutter in front of the image capture unit;
a control unit connected to the secondary shutter and configured to close and open the secondary shutter depending on a signal received from a disturbance detector,
wherein the disturbance detector detects pulsed light sources.

11. A device for capturing long-exposure images comprising:
an image capture unit;
an image formation unit in front of the image capture unit;
a primary shutter in front of the image capture unit or embedded into the image capture unit;
a secondary shutter in front of the image capture unit;
a control unit connected to the secondary shutter and configured to close and open the secondary shutter depending on a signal received from a disturbance detector,
wherein the disturbance detector tracks satellites.

12. A device for capturing long-exposure images comprising:
an image capture unit;
an image formation unit in front of the image capture unit;
a primary shutter in front of the image capture unit or embedded into the image capture unit;
a secondary shutter in front of the image capture unit;
a control unit connected to the secondary shutter and configured to close and open the secondary shutter depending on a signal received from a disturbance detector,
wherein the disturbance detector monitors objects capable of distorting the image.

13. A device for capturing long-exposure images comprising:
an image capture unit;
an image formation unit in front of the image capture unit;
a primary shutter in front of the image capture unit or embedded into the image capture unit;
a secondary shutter in front of the image capture unit;
a disturbance detector;
a control unit connected to the secondary shutter and to the disturbance detector, and configured to close and open the secondary shutter depending on a signal received from the disturbance detector,
wherein the disturbance detector is a pulsed light source detector, a satellite tracker or a monitor of objects capable of distorting images captured by the image capture unit.

14. A device for capturing long-exposure astronomical images comprising:
an image capture unit;
an image formation unit in front of the image capture unit;
a primary shutter in front of the image capture unit or embedded into the image capture unit;
a secondary shutter in front of the image capture unit;
a disturbance detector that tracks orbital objects transiting a field of view of the image capture unit;
a control unit connected to the secondary shutter and to the disturbance detector, and configured to operate the secondary shutter when the disturbance detector detects an orbital object transiting the field of view.

15. A device for capturing long-exposure images comprising:
an image sensor;
a lens in front of the image sensor;
a primary shutter in front of the image sensor;
a secondary shutter between the lens and the primary shutter, wherein the primary shutter remains open for at least 20 seconds during exposure;
a disturbance detector; and
a controller configured to fully close and open the secondary shutter in response to a signal received from the disturbance detector,
wherein the image sensor remains in integration mode when the secondary shutter is closed during the exposure.

16. The device of claim 15, wherein the primary shutter is embedded into the image sensor.

17. The device of claim 15, wherein the secondary shutter goes from an open state to a closed state in less than 100 ms.

18. The device of claim 15, wherein controller is also connected to the primary shutter and extends a time of exposure based on a time the secondary shutter is closed, by keeping the primary shutter open longer during the exposure.

* * * * *